(12) United States Patent
Relats Casas et al.

(10) Patent No.: US 9,293,898 B2
(45) Date of Patent: Mar. 22, 2016

(54) PROTECTIVE TUBE

(75) Inventors: Pere Relats Casas, Caldes de Montbui (ES); Anna Fruns Martín, Caldes de Montbui (ES); Dolors Artola Solé, Caldes de Montbui (ES); Jordi Relats Manent, Caldes de Montbui (ES)

(73) Assignee: Relats, S.A., Caldes de Montbui (ES)

( * ) Notice: Subject to any disclaimer, the term of this patent is extended or adjusted under 35 U.S.C. 154(b) by 609 days.

(21) Appl. No.: 13/583,307

(22) PCT Filed: Apr. 15, 2011

(86) PCT No.: PCT/ES2011/070259
§ 371 (c)(1),
(2), (4) Date: Sep. 7, 2012

(87) PCT Pub. No.: WO2011/128484
PCT Pub. Date: Oct. 20, 2011

(65) Prior Publication Data
US 2012/0328810 A1  Dec. 27, 2012

(30) Foreign Application Priority Data
Apr. 16, 2010 (EP) .................... 10382084

(51) Int. Cl.
*D04B 21/16* (2006.01)
*H02G 3/04* (2006.01)
*F16L 57/06* (2006.01)

(52) U.S. Cl.
CPC ............. *H02G 3/0487* (2013.01); *D04B 21/16* (2013.01); *F16L 57/06* (2013.01); *D07B 2201/20907* (2015.07); *D10B 2403/0311* (2013.01); *D10B 2505/12* (2013.01); *Y10T 428/1362* (2015.01)

(58) Field of Classification Search
CPC .......... D04B 21/205; D04B 21/21202; D04B 21/16; D04B 21/202
See application file for complete search history.

(56) References Cited

U.S. PATENT DOCUMENTS 4,074,512 A    2/1978 Matt
4,100,770 A *  7/1978 Titone .............................. 66/193
(Continued)

FOREIGN PATENT DOCUMENTS

EP    0784181 A1    7/1997
ES    2190725 A1    8/2003
(Continued)

OTHER PUBLICATIONS

Igualador, A.P., "International Search Report", for PCT/ES2011/070182, as mailed Jul. 29, 2011, 2 pages.
(Continued)

*Primary Examiner* — Danny Worrell
(74) *Attorney, Agent, or Firm* — Winstead PC

(57) ABSTRACT

The protective tube comprises a plurality of warp-knitted threads that define a strip the longitudinal edges of which are in contact with or overlap each other, defining a substantially circular cross-section, wherein at least one of said threads is monofilament thread, characterised in that at least one of the threads is carried on two or more needles, forming a mesh at least every two passes and a maximum of every twenty-five passes.
It gives the protective tube greater curvature than that of currently known tubes, closing completely without need for heating for the strip to acquire its tubular shape.

12 Claims, 8 Drawing Sheets

(56) References Cited

U.S. PATENT DOCUMENTS

| | | | |
|---|---|---|---|
| 4,781,039 A * | 11/1988 | Ribarev et al. | 66/80 |
| 4,946,722 A | 8/1990 | Moyer | |
| 4,983,240 A | 1/1991 | Orkin et al. | |
| 5,445,599 A * | 8/1995 | Edenbaum | 602/76 |
| 6,854,298 B2 * | 2/2005 | Relats et al. | 66/203 |
| 6,963,031 B2 * | 11/2005 | Gladfelter et al. | 174/74 A |
| 6,978,643 B2 * | 12/2005 | Akers et al. | 66/170 |
| 7,216,678 B2 * | 5/2007 | Baer | 139/384 R |
| 7,395,680 B2 * | 7/2008 | Baer et al. | 66/170 |
| 2004/0109965 A1 | 6/2004 | Klinklin | |
| 2005/0124249 A1 * | 6/2005 | Uribarri | 442/304 |
| 2006/0016507 A1 | 1/2006 | Baer | |

FOREIGN PATENT DOCUMENTS

| | | |
|---|---|---|
| GB | 1466659 A | 3/1977 |
| WO | WO-2007076530 A2 | 7/2007 |
| WO | WO-2009010599 A1 | 1/2009 |

OTHER PUBLICATIONS

Igualador, A.P., "International Search Report", for PCT/ES2011/070259, as mailed Sep. 7, 2011, 3 pages.

* cited by examiner

PROTECTIVE TUBE

The present invention relates to a protective tube formed from a strip, the longitudinal edges of which are in contact with or overlap each other.

BACKGROUND OF THE INVENTION

In the current state of the art, protective tubes formed of interwoven threads are used to protect elongated elements, for example cables, in the automotive or aeronautics industry.

One type of currently known protective tubes is manufactured from a lamina the longitudinal edges of which overlap each other, defining the tubular shape.

Said strip is currently made up of an appropriate threaded structure that enables the strip to curve, even slightly.

However, in order to achieve the desired closed effect, i.e. a permanent tubular shape, a treatment is usually applied subsequent to the formation of the strip.

Thus, for example, patent U.S. Pat. No. 4,946,722 discloses a protective tube having these characteristics which requires a final treatment for joining said longitudinal edges, for example by sewing of fixation elements.

Another frequent treatment in this type of protective tubes is a thermal treatment, whereby the threads are heated for the strip to acquire its final tubular shape.

Therefore, the need for a protective tube of this type is evident, wherein the degree of curvature without application of a final treatment is greater than in currently known tubes.

DESCRIPTION OF THE INVENTION

The protective tube of the invention resolves the aforementioned drawbacks and has other advantages that will be described later on.

The protective tube of the present invention which comprises a plurality of warp-knitted threads that define a strip, the longitudinal edges of which are in contact with or overlap each other, defining a substantially circular cross-section, wherein at least one of said threads is monofilament thread, characterised in that at least one of the threads is carried by one or two needles, forming a mesh at least every two passes and a maximum of every twenty-four passes.

Advantageously, one of the threads is interwoven forming tricot stitches, at least partially.

According to some embodiments, said interwoven thread that forms tricot stitches is disposed at the end of the weave.

If desired, said thread can form combined tricot and chain stitches or combined tricot and warp stitches.

According to preferred embodiments, said interwoven thread that forms tricot stitches is carried on three to twenty-five needles.

If desired, the protective tube can also comprise a thread that forms warp stitches, in which case said thread that forms warp stitches would be carried on two to twenty-five needles.

The protective tube can also comprise a thread that forms chain stitches.

In some embodiments, the protective tube of the present invention comprises two or more threads that form tricot stitches. In this case, two adjacent threads that form tricot stitches are preferably disposed in opposite directions to each other.

Preferably, each embodiment has a density of between 2.5 and 12 passes per centimetre.

If desired, in the protective tube of the present invention said tricot stitches can form an open and/or closed mesh.

Preferably, said mesh-forming threads are disposed in opposite directions to each other, and said threads that form a warp are interwoven forming tricot and/or chain stitches.

Advantageously, said threads that form tricot stitches are monofilament threads, particularly of a polymer material, for example polyester or polyamide, with a diameter comprised between 0.10 mm and 0.50 mm.

According to a preferred embodiment, said threads are interwoven forming, in order, chain, tricot and warp stitches.

The protective tube of the present invention has the main advantage that it has a greater curvature than that of currently known tubes, closing completely without need of heating for the strip to acquire its tubular shape.

It must be pointed out that when reference is made to the fact that the tube "closes", it means that the longitudinal edges of the strip that form the tube are in contact with or overlap each other, defining a substantially circular cross-section.

BRIEF DESCRIPTION OF THE FIGURES

In order to better understand the foregoing, drawings are attached wherein, schematically and solely for illustrative purposes, a preferred embodiment is represented.

DESCRIPTION OF A PREFERRED EMBODIMENT

FIGS. 1 to 16 show sixteen different weaves of the protective tube of the present invention.

It should be noted that, in all cases, the threads can be made of any appropriate material, but one of these must necessarily be monofilament thread.

In particular, the monofilament thread is that which forms tricot stitches, which can be an open and/or closed mesh.

Figure 1:
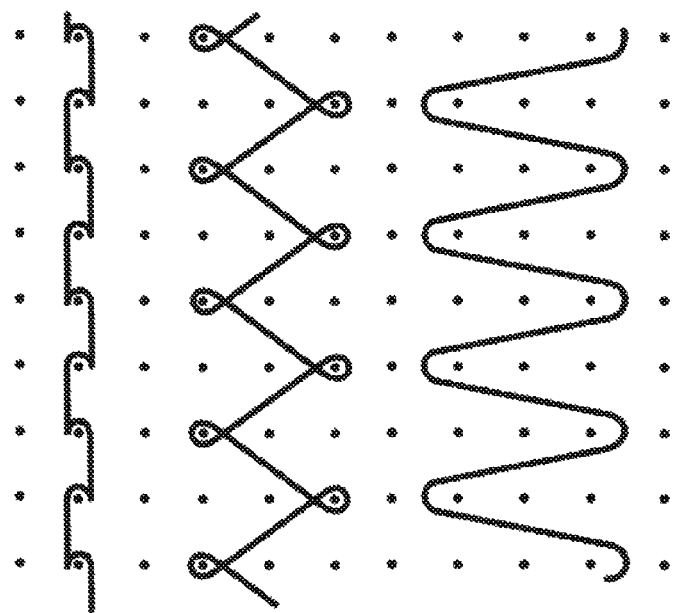
FIGS. 1 to 16 show schematic views of sixteen embodiments of threads for forming the protective tube of the present invention.

FIG. 1 shows weave no. 1, which includes three types of stitches in the following order:
  chain stitch;
  tricot stitch on three needles;
  warp stitch on three needles.

Figure 2:
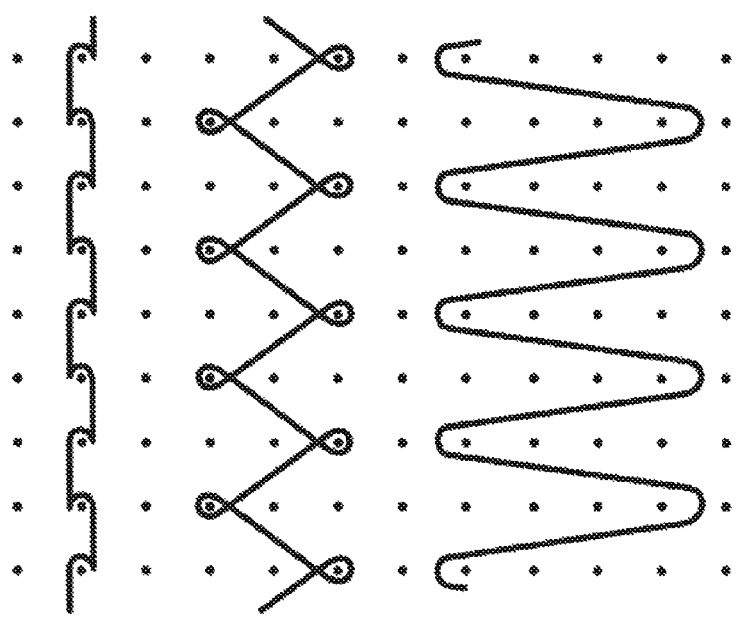

FIG. 2 shows weave no. 2, which includes three types of stitches in the following order:
  chain stitch;
  tricot stitch on three needles;
  warp stitch on four needles.

Figure 3:
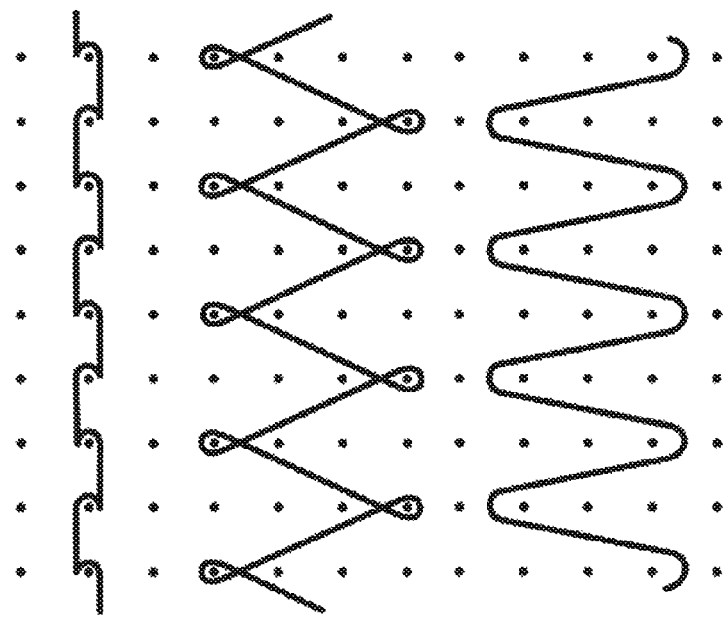

FIG. 3 shows weave no. 3, which includes three types of stitches in the following order:
  chain stitch;
  tricot stitch on four needles;
  warp stitch on three needles.

Figure 4:
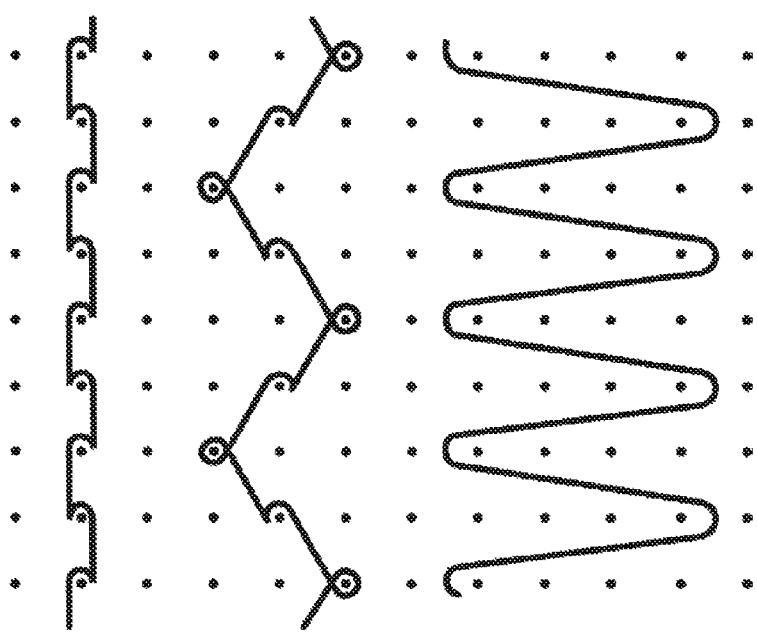

FIG. 4 shows weave no. 4, which includes three types of stitches in the following order:
  chain stitch;
  tricot stitch combined with chain stitch (atlas type) on three needles;
  warp stitch on four needles.

Figure 5:
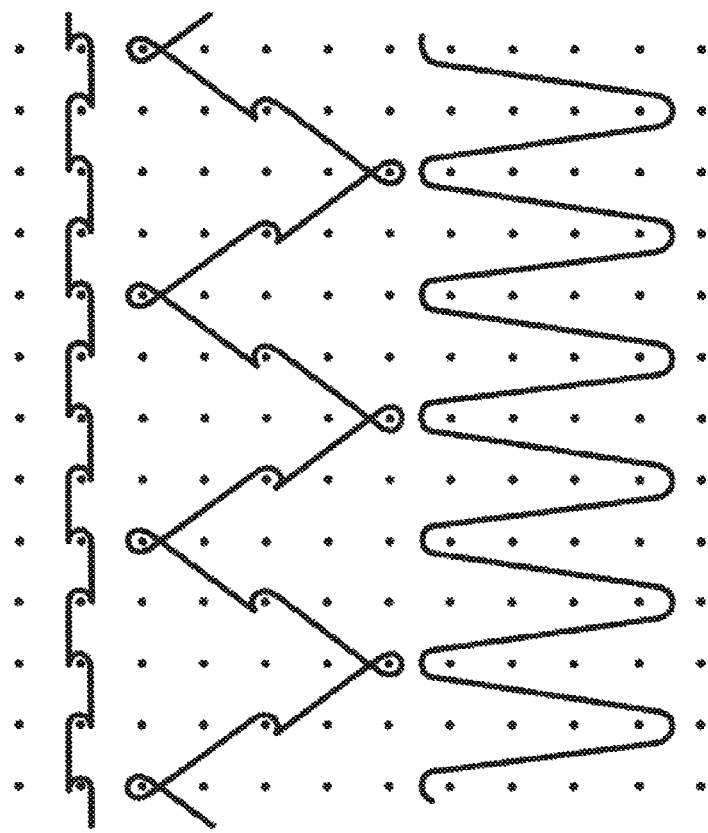

FIG. 5 shows weave no. 5, which includes three types of stitches in the following order:
  chain stitch;
  tricot stitch combined with chain stitch (atlas type) on five needles;
  warp stitch on four needles.

Figure 6:
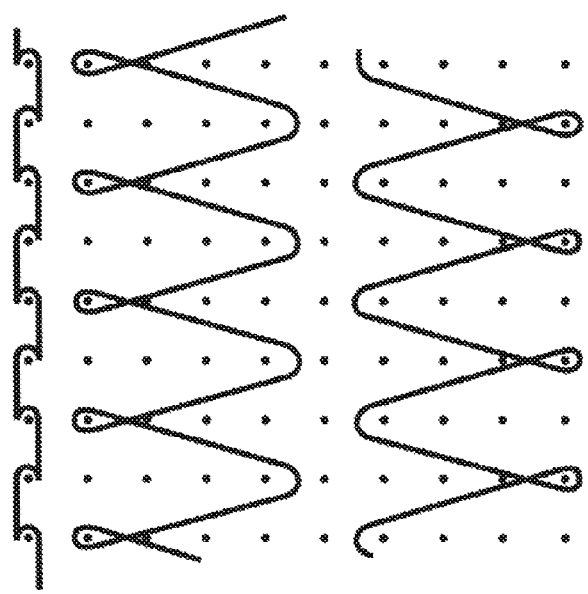

FIG. 6 shows weave no. 6, which includes three types of stitches in the following order:
chain stitch;
tricot stitch combined with warp stitch on four needles;
warp stitch combined with tricot stitch on four needles, in the opposite direction to the foregoing.

Figure 7:
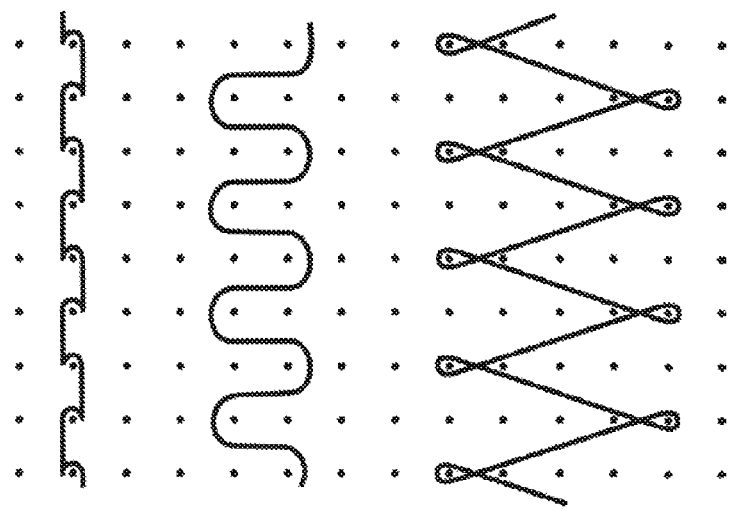

FIG. 7 shows weave no. 7, which includes three types of stitches in the following order:
chain stitch;
warp stitch on two needles;
tricot stitch on five needles.

Figure 8:
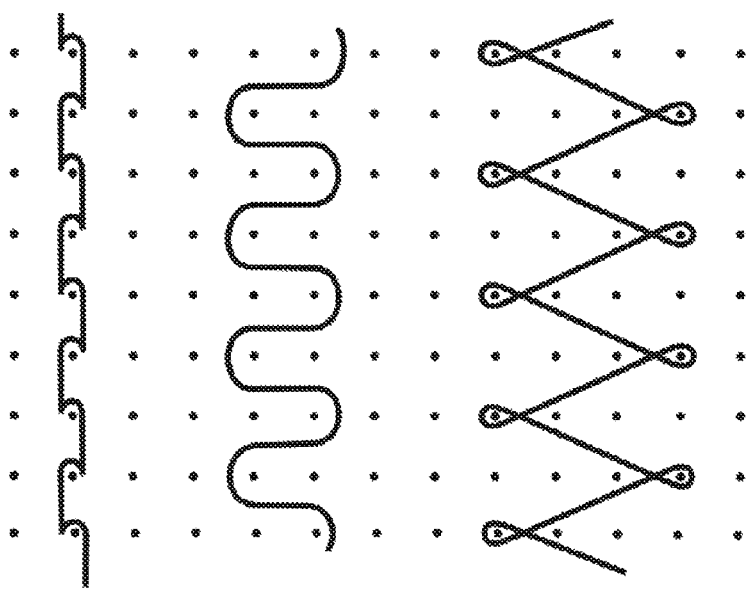

FIG. 8 shows weave no. 8, which includes three types of stitches in the following order:
chain stitch;
warp stitch on two needles;
tricot stitch on four needles.

Figure 9:
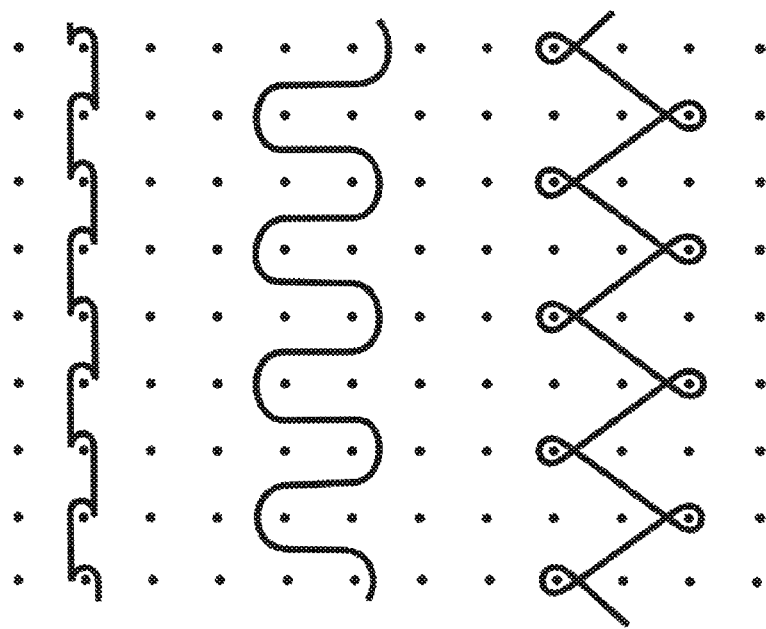

FIG. 9 shows weave no. 9, which includes three types of stitches in the following order:
chain stitch;
warp stitch on two needles;
tricot stitch on three needles.

Figure 10:
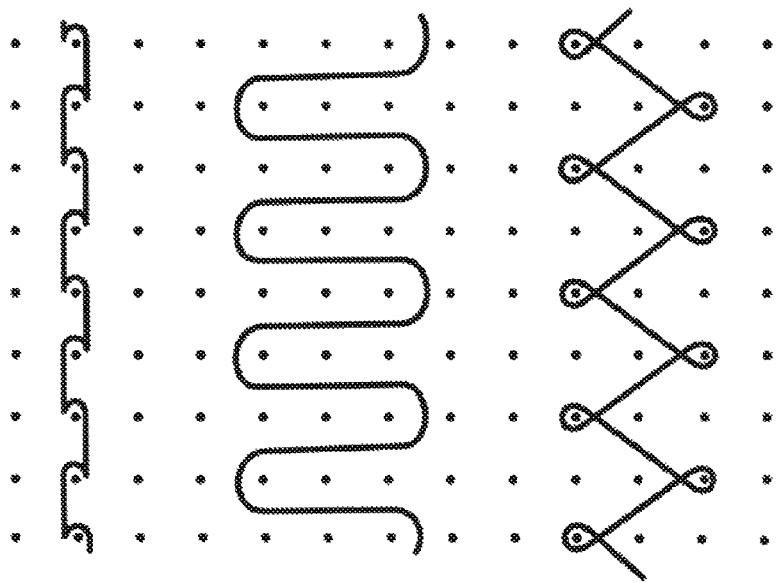

FIG. 10 shows weave no. 10, which includes three types of stitches in the following order:
chain stitch;
warp stitch on three needles;
tricot stitch on three needles.

Figure 11:
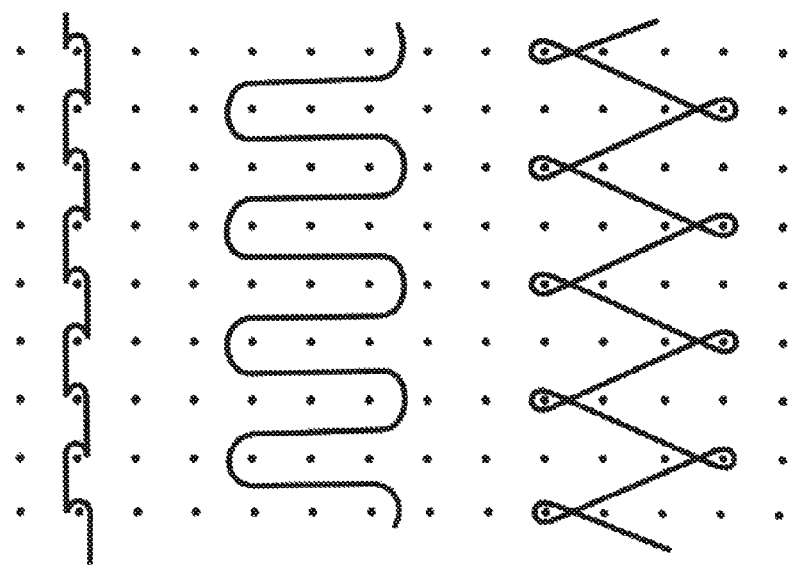

FIG. 11 shows weave no. 11, which includes three types of stitches in the following order:
chain stitch;
warp stitch on three needles;
tricot stitch on four needles.

Figure 12:
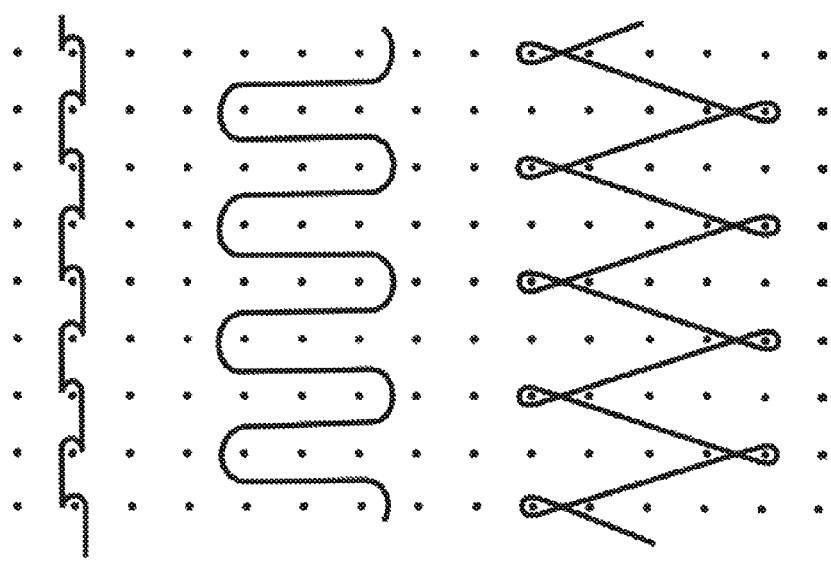

FIG. 12 shows weave no. 12, which includes three types of stitches in the following order:
chain stitch;
warp stitch on three needles;
tricot stitch on five needles.

Figure 13:
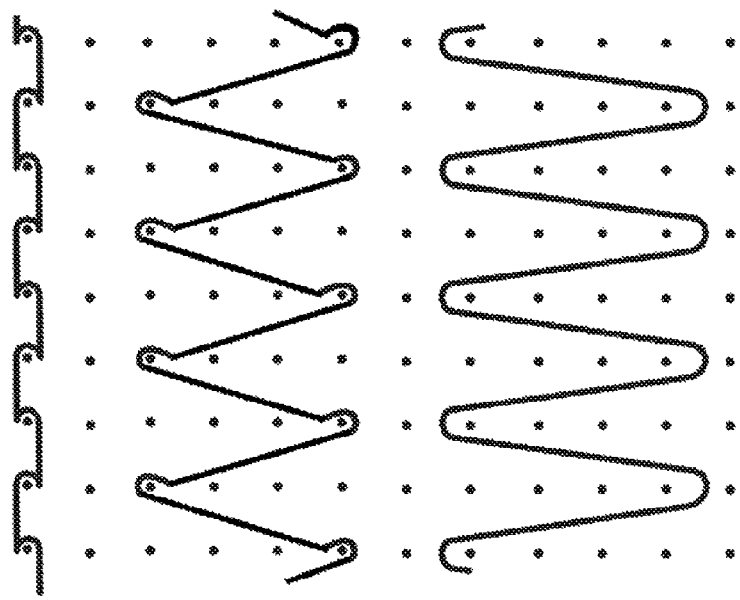

FIG. 13 shows weave no. 13, which includes three types of stitches in the following order:
chain stitch;
tricot stitch on four needles with open warp;
warp stitch on four needles.

Mention should be made that, in this case, the thread of the chain stitch can be a 500 decitex polyester multifilament thread, the thread of the tricot stitch can be 0.25 mm diameter polyester monofilament thread, and the thread of the warp stitch can be a 500 decitex polyester multifilament thread.

Mention should also be made that these types of threads can be applied to other embodiments of the protective tube of the present invention.

Figure 14:
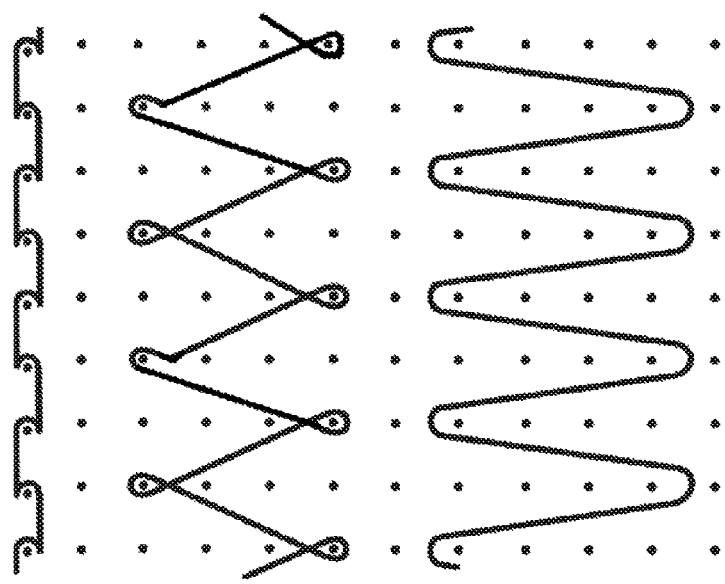

FIG. 14 shows weave no. 14, which includes three types of stitches in the following order:
chain stitch;
tricot stitch on four needles with open warp and closed warp;
warp stitch on four needles.

Figure 15:
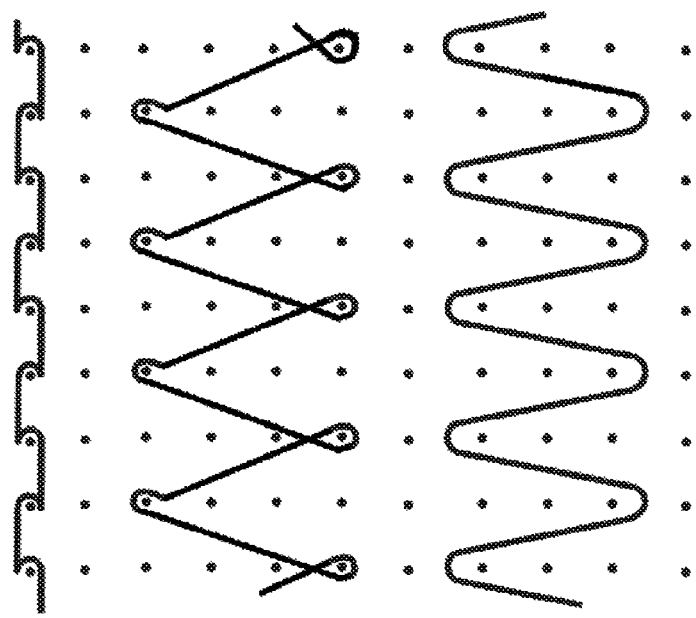

FIG. 15 shows weave no. 15, which includes three types of stitches in the following order:
chain stitch;
tricot stitch on four needles with open warp and closed warp;
warp stitch on three needles.

Figure 16:
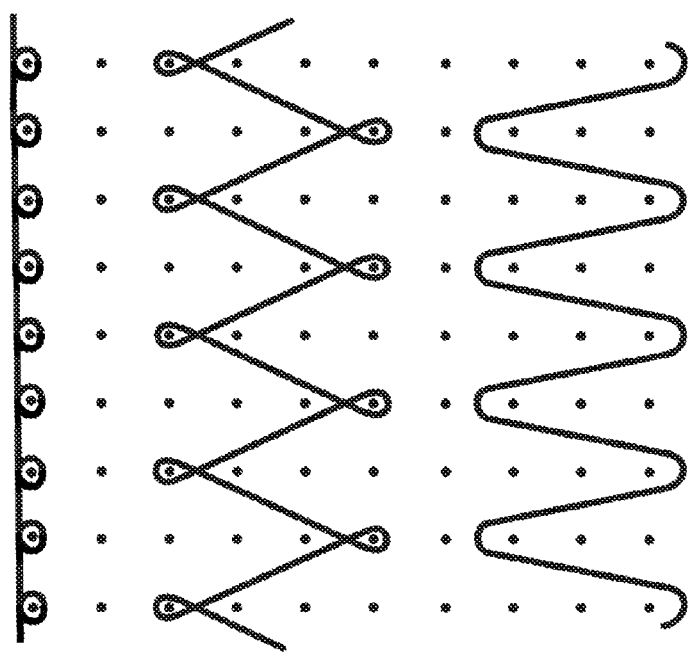

FIG. 16 shows weave no. 16, which includes three types of stitches in the following order:
chain stitch;
tricot stitch on four needles with closed warp;
warp stitch on three needles.

The following table indicates the positions of the stitches of the aforementioned weaves:

TABLE 1

| Weave no. | P-1 | P-2 | P-3 |
|---|---|---|---|
| 1 | 0-2 | 4-6 | 0-0 |
|   | 2-0 | 2-0 | 6-6 |
| 2 | 2-0 | 2-0 | 8-8 |
|   | 0-2 | 4-6 | 0-0 |
| 3 | 0-2 | 6-8 | 0-0 |
|   | 2-0 | 2-0 | 6-6 |
| 4 | 2-0 | 2-0 | 8-8 |
|   | 0-2 | 2-4 | 0-0 |
|   |     | 4-6 |     |
|   |     | 4-2 |     |
| 5 | 0-2 | 8-10 | 8-8 |
|   | 2-0 | 6-4 | 0-0 |
|   |     | 2-0 |     |
|   |     | 4-6 |     |
| 6 | 0-2 | 6-8 | 8-8 |
|   | 2-0 | 0-0 | 2-0 |
| 7 | 0-2 | 0-0 | 8-10 |
|   | 2-0 | 4-4 | 2-0 |
| 8 | 0-2 | 0-0 | 6-8 |
|   | 2-0 | 4-4 | 2-0 |
| 9 | 0-2 | 0-0 | 4-6 |
|   | 2-0 | 4-4 | 2-0 |
| 10 | 0-2 | 0-0 | 4-6 |
|    | 2-0 | 6-6 | 2-0 |
| 11 | 0-2 | 0-0 | 6-8 |
|    | 2-0 | 6-6 | 2-0 |
| 12 | 0-2 | 0-0 | 8-10 |
|    | 2-0 | 6-6 | 2-0 |
| 13 | 0-2 | 8-6 | 0-0 |
|    | 2-0 | 0-2 | 8-8 |
| 14 | 2-0 | 8-6 | 0-0 |
|    | 0-2 | 2-0 | 8-8 |
|    |     | 6-8 |     |
|    |     | 2-0 |     |
| 15 | 2-0 | 8-6 | 0-0 |
|    | 0-2 | 2-0 | 6-6 |
| 16 | 2-0 | 6-8 | 0-0 |
|    | 2-0 | 2-0 | 6-6 |

Despite the fact that reference has been made to a specific embodiment of the invention, it is evident to a person skilled in the art that the protective tube described is susceptible of numerous variations and modifications, and that all the aforementioned details can be substituted by other technically equivalent ones, without detracting from the scope of protection defined by the attached claims.

The invention claimed is:

1. A protective tube comprising:
a plurality of warp-knitted threads defining a strip longitudinal edges of which are in contact with or overlap each other defining a substantially circular cross-section;
wherein at least one thread of said plurality of warp-knitted threads is a monofilament thread which forms, at least partially, tricot stitches,
wherein said at least one thread of said plurality of warp-knitted threads is displaced over two or more wales and forms a lap every at least two courses and at most twenty-four courses, and
wherein said threads of said plurality of warp-knitted threads are interwoven forming, in order, chain stitches, at least partially tricot stitches and weft inlay stitches, said order referring to a depth position through a thickness of the strip, such that chain stitches are closer to a strip thickness boundaries and the weft inlay stitches are closer to the center of the strip thickness.

2. The protective tube according to claim 1, wherein said thread forming, at least partially, tricot stitches also forms chain stitches, thus forming combined tricot and chain stitches.

3. The protective tube according to claim 1, wherein said thread forming, at least partially, tricot stitches also forms weft inlay stitches, thus forming combined tricot and weft inlay stitches.

4. The protective tube according to claim 1, wherein said thread that forms, at least partially, tricot stitches is displaced over three to twenty-five wales.

5. The protective tube according to claim 1, wherein said thread that forms weft inlay stitches is displaced over two to twenty-five wales.

6. The protective tube according to claim 1, wherein the plurality of warp-knitted threads comprises two or more monofilament threads each forming tricot stitches.

7. The protective tube according to claim 6, wherein two adjacent threads, of the plurality of warp-knitted threads, that form tricot stitches are disposed in opposite directions to each other.

8. The protective tube according to claim 1, wherein each embodiment has a stitch density of between 2.5 and 12 courses per centimeter.

9. The protective tube according to claim 1, wherein said tricot stitches form an open lap.

10. The protective tube according to claim 6, wherein said two or more monofilament threads that form tricot stitches are made of a polymer material with a diameter comprised between 0.10 mm and 0.50 mm.

11. The protective tube according to claim 1, wherein said tricot stitches form a closed lap.

12. The protective tube according to claim 1, wherein said tricot stitches form an open lap and a closed lap.

* * * * *